Dec. 18, 1962     M. B. MENTLEY     3,068,619
WORK SUPPORTING ARBOR
Filed Dec. 27, 1957

INVENTOR.
MAX B. MENTLEY
BY Whittemore,
Hulbert & Belknap
ATTORNEYS

United States Patent Office 3,068,619
Patented Dec. 18, 1962

3,068,619
WORK SUPPORTING ARBOR
Max B. Mentley, Detroit, Mich., assignor to National Broach & Machine Company, Detroit, Mich., a corporation of Mich.
Filed Dec. 27, 1957, Ser. No. 705,695
6 Claims. (Cl. 51—237)

The present invention relates to a work supporting arbor, and more particularly, to an assembly of thin gears on such arbor.

It is an object of the present invention to provide an assembly of thin gears having lateral projections at one side thereof, washers interposed between said gears shaped to provide clearance for said projections, an arbor having a cylindrical portion fitting snugly within central holes within said gears and having a shoulder engaged by one end of a stack of such gears, and a resiliently biased annular abutment carried by said arbor and engageable with the opposite end of the stack of gears.

More specifically, it is an object of the present invention to provide an assembly of thin gears on an arbor, the arbor including means for applying radial pressure between said gears, said gears having openings spaced radially from the center thereof, said arbor including a pin extending within the openings in said gears, said gears being movable to position corresponding portions of said openings into contact with said pin to provide substantial alignment of the teeth of the gears.

It is a further object of the present invention to provide an assembly comprising an approximate locator having locator pins, an arbor adapted to be received on said locator in engagement with said pins, said arbor having a stationary shoulder thereon with a fixed pin projecting therefrom parallel to the axis of the arbor, a stack of thin gears positioned on the arbor all provided with enlarged openings through which the pin extends, said arbor having a resilient abutment engageable with the end of said stack of gears remote from said shoulder and adapted to press the stack of gears against the shoulder, said gears being rotatable on the arbor to position corresponding sides of said openings into contact with said pin to provide for substantial alignment between the teeth of said gears.

It is a further object of the present invention to provide a support for a work gear or work gear structure for use in a gear finishing machine in which the work gear is rotated in mesh with a gear-like tool and has a circular central opening therethrough, the support including an arbor having very limited clearance with respect to the hole in the gear structure, and frictional means on the arbor for gripping the work gear structure for shifting movement under continuously applied radial pressure during rotation of the arbor.

Other objects and features of the invention will become apparent as the description proceeds, especially when taken in conjunction with the accompanying drawing, illustrating a preferred embodiment of the invention, wherein.

Figure 1:
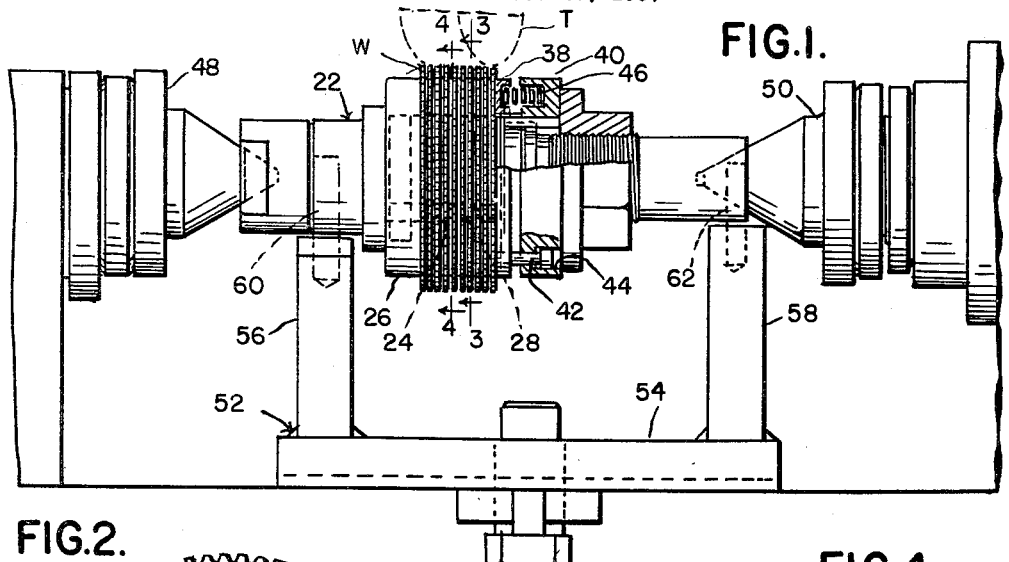
FIGURE 1 is a fragmentary elevational view, partly in section, of an assembly of gears on an arbor between centers and showing also the approximate locator.
Figure 2:
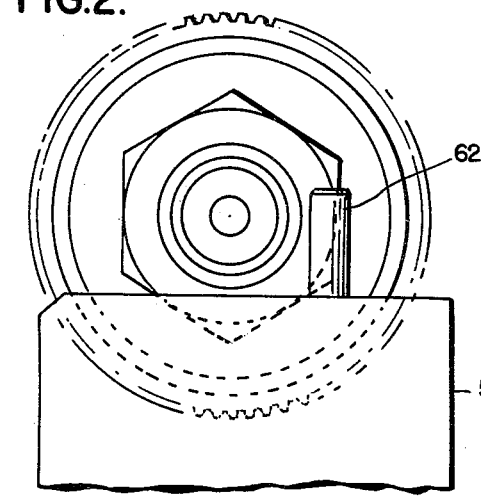
FIGURE 2 is an enlarged end view of the assembly of gears on the arbor supported on the approximate locator.
Figure 3:
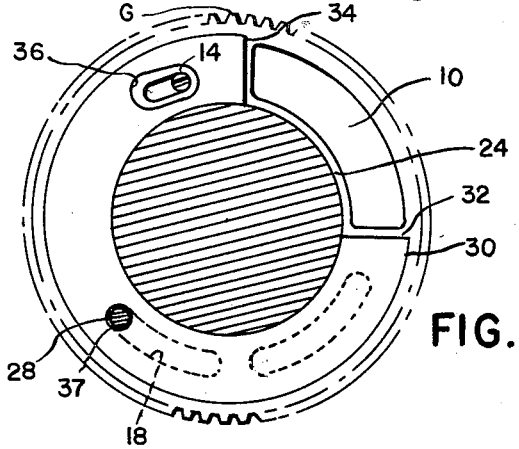
Figure 4:
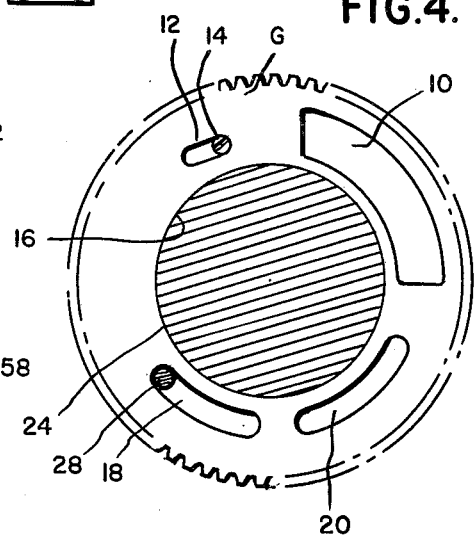

FIGURES 3 and 4 are enlarged sectional views on the lines 3—3 and 4—4 respectively, in FIGURE 1.

Referring first to FIGURE 1, there is illustrated at W a work assembly comprising a stack of relatively thin gears G one of which is best illustrated in FIGURE 4. As seen in this figure, the gear G includes at one side thereof a lateral extension 10 which may be of approximately the same thickness as the thickness of the gear G. The gear also includes a resilient leaf spring 12 attached thereto by a screw 14. The projection or extension 10, the spring 12, and the screw 14 obviously interfere with assembling a plurality of gears G in a tight stack. The gears G are each provided with relatively large cylindrical openings 16 and in addition are provided with arcuate slots 18 and 20.

In accordance with the present invention, a plurality of gears G are assembled into a stack designated W and are adapted to be run in mesh with a gear finishing tool T which may be in the form of a gear hone. The gear hone has teeth conjugate to the teeth of the gear G and has tooth portions made of a solid plastic material having abrasive particles embedded therein. In operation the tool T is driven in rotation and drives the assembly W of gears by virtue of the meshed engagement between the members. Depending upon the particular operation, the axes of the tool T and of the assembly W of gears, may be parallel. However, as illustrated herein the axes are crossed at a small angle as for example 15 degrees. As a result of this, meshed rotation between the tool T and the assembly W of gears is accomplished by a relative slow traverse in a plane parallel to the axes of the tool T and assembly W, as for example a direction parallel to the axis of the assembly W of gears.

In accordance with the present invention the individual gears G are intended to be permitted slight rotation relative to each other as they are driven in rotation by the tool T. The arrangement which provides for this is an arbor 22 having an intermediate cylindrical portion 24 on which the gears are received. The openings 16 in the gears fit snugly on the cylindrical portion 24 of the arbor and prevent relative radial movement of the gears on the arbor. The arbor is provided with a fixed shoulder or abutment 26 against which one end of the stack W of gears abuts. Projecting from the shoulder 26 is a fixed pin 28 which extends through one of the arcuate openings, as for example the opening 18 in the gears.

In order that the assembly of gears may be clamped firmly, a plurality of arcuate washers 30 are provided, these washers having ends 32 and 34 adapted to be spaced slightly from the lateral projections 10 of the gears. As illustrated in the particular embodiment described herein, the washers 30 have an annular extent of approximately 270 degrees. In addition, the washers 30 are provided with enlarged openings 36 which receive the leaf springs 12 and assembly screws 14. Finally, the washers 30 are provided with openings 37 having small clearance as for example 1/32 of an inch with the pin 28. In order to retain the assembly of gears and washers in firm pressure contact, although with provision for relative angular movement of the gears, there is provided a spring pressed annular abutment 38 which is axially spaced from an annular member 40 and is connected thereto by screws 42. The head portions of the screws are slidable in openings 44 and the screws merely serve to prevent separation between members 38 and 40. Received in appropriate spring pockets as well illustrated in FIGURE 1, are a plurality of coil compression springs 46 urging the annular abutment 38 to the left as seen in FIGURE 1.

The gear assembly and arbor are adapted to be supported in use by a pair of centers 48 and 50 which are mounted for free rotation and which are relatively movable toward and away from each other. The ends of the arbor 24 are recessed and the noses of the centers 48 and 50 are generally conical.

Located between the centers is an approximate locator indicated generally at 52 comprising a base 54 and upstanding members 56 and 58 on which the ends of the arbor 22 are adapted to rest. Located on the members 56 and 58 are locator pins 60 and 62 respectively. The arrangement is such that when the assembly of gears and arbors is supported on the members 56 and 58 and engaged with the locator pins 60 and 62 respectively, it is in approximate position for finishing. If at this time the centers 48 and 50 are moved toward each other the tapered noses of the centers enter the recesses in the ends of the arbor and pick the arbor up off of the members 56 and 58 and also moves the arbor out of contact with the locator pins 60 and 62.

The pin 28 has as its primary function the initial location of the gears G in position to mesh properly with the teeth of the honing tool T. When the gears have been assembled on the arbor with the pin 28 extending through the arcuate slots 18, all of the gears are turned in the same direction until the same end of the slot 18 of all gears contacts the pin 28. The slots 18 are accurately provided in the gears in exact angular position with reference to the teeth so that at this time all of the teeth are in alignment, or sufficiently so so that the teeth of the honing tool T can enter into meshed engagement with the teeth of the gears G.

As best seen in FIGURE 3, each of the gears G is permitted substantial angular movement with respect to the washers 30. The washers however, have very limited angular movement with respect to the arbor by virtue of the small clearance existing between the pin 28 and the washer openings 37. Angular movement of the gears is limited by engagement between the lower end of the projection 10, as seen in FIGURE 3, and the end of the washer, or similar engagement between the screw 14 and the end of the openings 36.

The foregoing description has been directed to an arrangement in which a plurality of relatively thin gears are assembled on the arbor. The invention however, is capable of a broader application in that it may be employed with a single work gear. In this case it is used primarily to obtain optimum concentricity in the work gear.

If the hole size in a series of gears to be finished varies by one-thousandth of an inch, but the concentricity of the pitch diameter to the hole must be held to within one-thousandth of an inch, then selective arbors must be used to maintain this limit, since a variation of one-thousandth in hole size will produce a possible two-thousandths eccentricity on an arbor ground exactly to the low limit of the hole size.

However, if an arbor of the spring loaded type as disclosed herein is employed, the operation of the gear finishing machine will produce precisely constant pin size as measured from the pitch diameter at any point to the adjacent inside of the central hole of the gear. In other words, if the hole is located with perfect accuracy, theoretically perfect concentricity in the finished gear will be obtained. Accordingly, the arbor equipped with the spring loaded collar and the abutment is useful not only in conjunction with a plurality of relatively thin gears mounted with their teeth in alignment, but it also allows these gears, as well as a single gear correspondingly mounted, to move radially always against the top side of the arbor. This produces constant dimension from the top of the arbor or from hole size to the pitch diameter irrespective of hole variation.

It will be appreciated that the foregoing relates to variations of not more than a few thousandths of an inch so that for practical purposes the radial movement of the gear relative to the arbor is extremely small. The operation is carried out with radial pressure developed between the work gear and the gear-like tool and this pressure is always effective to maintain the work gear in contact with the side of the arbor adjacent the cutter or tool. The arbor may rotate or in some cases it may be stationary, and the work gear driven in rotation on the stationary arbor. If a plurality of gears are to rotate on a stationary arbor, pin 28 will of course be omitted and the gear teeth aligned by other means, such as a pin engaged manually into tooth spaces of the gear. In the latter case of course, eccentricity or run-out in the arbor is eliminated.

The drawing and the foregoing specification constitute a description of the improved work supporting arbor in such full, clear, concise and exact terms as to enable any person skilled in the art to practice the invention, the scope of which is indicated by the appended claims.

What I claim as my invention is:

1. In a gear finishing machine in which work gear structure is run in mesh under radial pressure with a gear-like tool, the gear structure having an accurately located central hole therethrough, a gear support device comprising an arbor dimensioned to have very limited clearance in the hole in said gear structure, a rigid shoulder on said arbor for engagement by a side of a work gear structure mounted on said arbor, an annular member on said arbor engageable with the other side of said work gear structure, and resilient means acting between said shoulder and said annular member during a machining operation to clamp the work gear structure in relatively light frictional engagement therebetween for yielding movement both angularly and radially with respect to said arbor.

2. In a gear finishing machine in which work gear structure is run in mesh under radial pressure with a gear-like tool, the gear structure having an accurately located central hole therethrough, a gear support device comprising a rotary arbor dimensioned to have very limited clearance in the hole in said gear structure, a rigid shoulder on said arbor for engagement by a side of a work gear structure mounted on said arbor, an annular member on said arbor engageable with the other side of said work gear structure, and resilient means acting between said shoulder and said annular member during a machining operation to clamp the work gear structure in relatively light frictional engagement therebetween for yielding movement.

3. In a gear finishing machine in which a work gear is rotated under radial pressure with a gear-like finishing tool, an arbor for sequentially receiving a series of work gears having axially extending concentric circular holes therein, said arbor having a cylindrical portion received in the holes of the gears and providing radial clearance of not more than a few thousandths of an inch with respect thereto, a rigid shoulder on said arbor against which a side of a work gear engages, an annular member on the arbor engageable with the other side of a work gear, and resilient means acting between the arbor and annular member during a machining operation to provide relatively light frictional pressure contact between the gear, the shoulder, and the annular member, whereby radial pressure applied to the gear during its rotation presses the gear into rigid engagement with the side of the arbor facing the tool so as to eliminate the possibility of eccentricity in the finished gear traceable to a difference between hole size of the gear and diameter of the arbor.

4. A gear assembly comprising a plurality of thin gears having circular central holes and lateral projections at one side thereof, and openings adjacent the periphery spaced angularly from said projections, said assembly comprising an arbor having a central cylindrical portion fitting snugly within the holes of said gears, a shoulder on said arbor engageable by one end of a stack of gears supported on said arbor, and a spring pressed abutment ring on said arbor biased during a machining operation by said spring toward said shoulder, a drive and locating pin extending from said shoulder and received with clearance in the openings in said gears, and arcuate members received between the gears and having end portions adjacent said projections.

5. A gear assembly comprising a plurality of thin gears having circular central holes and lateral projections at one side thereof, and openings adjacent the periphery spaced angularly from said projections, said assembly comprising an arbor having a central cylindrical portion fitting snugly within the holes of said gears, a shoulder on said arbor engageable by one end of a stack of gears supported on said arbor, and a spring pressed abutment ring on said arbor biased during a machining operation by said spring toward said shoulder, a drive and locating pin extending from said shoulder and received with clearance in the openings in said gears, said gears being relatively circumferentially movable as permitted by the clearance of said pin in said openings.

6. A gear assembly comprising a series of thin gears having circular central holes and lateral projections at one side thereof, and openings adjacent the periphery spaced angularly from said projections, said assembly comprising an arbor having a central cylindrical portion fitting snugly within the holes of said gears, a shoulder on said arbor engageable by one end of a stack of gears supported on said arbor, and a spring pressed abutment ring on said arbor biased by said spring toward said shoulder, a drive and locating pin extending from said shoulder and received with clearance in the openings in said gears, said gears being relatively circumferentially movable as permitted by the clearance of said pin in said openings, the engagement between said pin and the corresponding sides of the openings in said gears serving to bring the teeth of said gears into substantial alignment.

References Cited in the file of this patent

UNITED STATES PATENTS

| | | |
|---|---|---|
| 2,352,726 | Maulding | July 4, 1944 |
| 2,793,865 | Staples | May 28, 1957 |